United States Patent
Appeldorn et al.

[11] Patent Number: 6,142,266
[45] Date of Patent: Nov. 7, 2000

[54] ENERGY STORING BRAKE FOR A VEHICLE

[75] Inventors: Matthias Appeldorn, Hamburg; Martin Hinkelmann, Escheburg, both of Germany

[73] Assignee: Still GmbH, Germany

[21] Appl. No.: 09/152,908

[22] Filed: Sep. 14, 1998

[30] Foreign Application Priority Data

Sep. 18, 1997 [DE] Germany .......................... 197 41 232

[51] Int. Cl.⁷ .......................... B60T 13/22; B60T 13/04
[52] U.S. Cl. .......................... 188/171; 303/9.76; 303/71; 188/72.3
[58] Field of Search .................. 188/170, 171, 188/166, 156, 158, 72.3, 216, 106 P; 303/9.76, 71; 92/130 A, 130 B, 130 R

[56] References Cited

U.S. PATENT DOCUMENTS

| | | | |
|---|---|---|---|
| 4,057,297 | 11/1977 | Beck et al. | 188/170 |
| 5,118,165 | 6/1992 | Latvala | 188/170 |
| 5,154,491 | 10/1992 | Graham | 303/9.76 |
| 5,577,578 | 11/1996 | Lazorchak | 188/171 |

FOREIGN PATENT DOCUMENTS

| | | |
|---|---|---|
| 9202894 | 5/1993 | Germany . |
| 19548517 | 6/1997 | Germany . |

*Primary Examiner*—Douglas C. Butler
*Attorney, Agent, or Firm*—Webb Ziesenheim Logsdon Orkin & Hanson, P.C.

[57] ABSTRACT

An energy storing brake for a vehicle, such as an industrial truck, includes a rotating brake rotor (5) and a non-rotating braking body (3) that can be moved relative to the brake rotor (5). The braking body (3) can be pressed by an energy storing device (4), preferably realized in the form of a spring, against the brake rotor (5), and can be detached from the brake rotor (5) by a brake lifter against the force of the energy storing mechanism (4). A hydraulic cylinder (8) can be pressurized as required, by which a supplemental force in the same direction as the force of the energy storing mechanism (4) can be exerted on the braking body (3). The hydraulic cylinder (8) can be pressurized as a function of the actuation of a brake control mechanism, preferably of a brake pedal, by an operator. The sum of the forces that can be exerted on the braking body (3) by the energy storing mechanism (4) and by the hydraulic cylinder (8) is quantitatively greater than the force that can be exerted on the braking body (3) by the brake lifter.

9 Claims, 1 Drawing Sheet

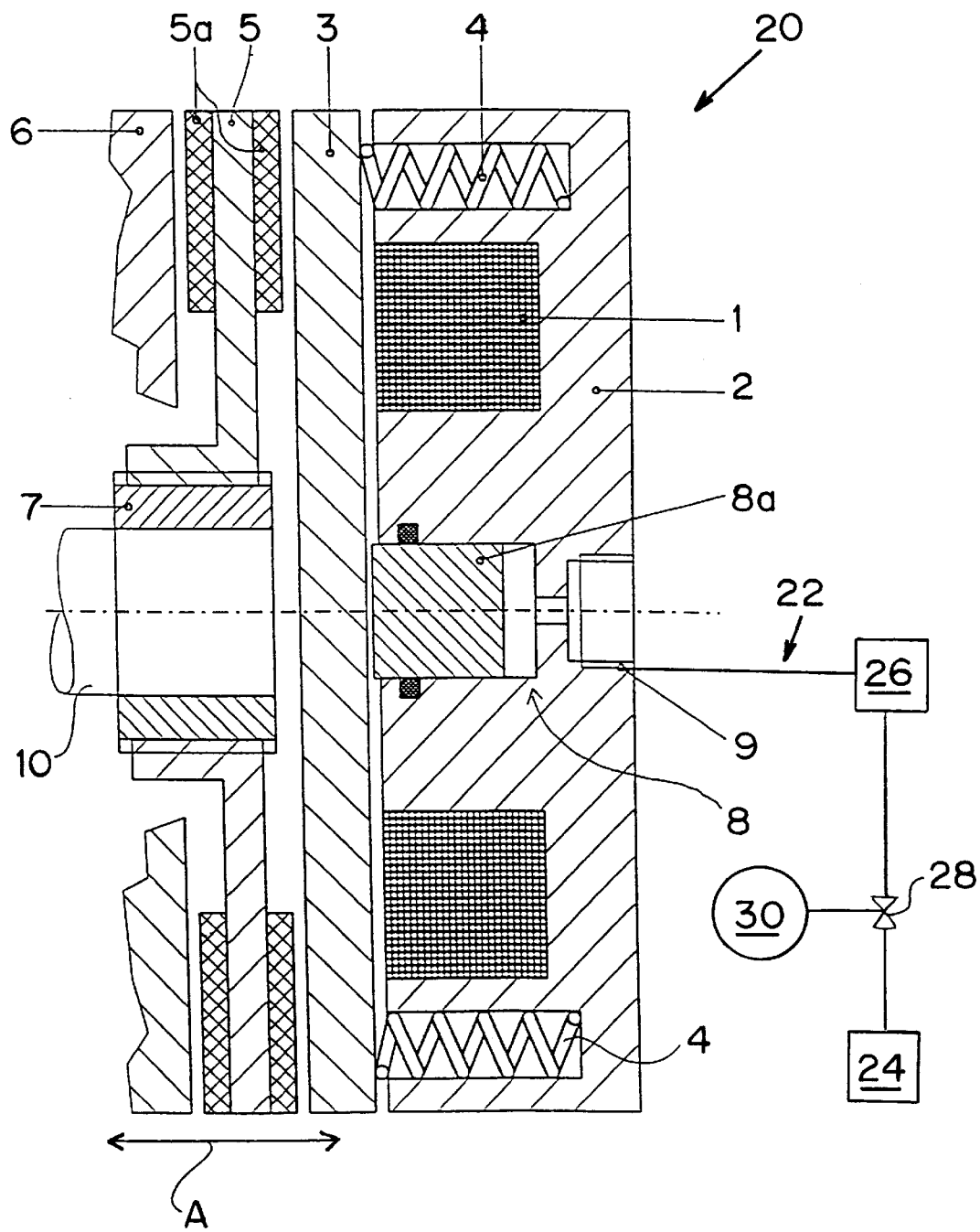

ENERGY STORING BRAKE FOR A VEHICLE

BACKGROUND OF THE INVENTION

1. Field of the Invention

The invention relates generally to an energy storing brake for a vehicle, such as an industrial truck, having a rotating brake rotor and a non-rotating braking body that can move relative to the brake rotor, which braking body can be pressed by an energy storing mechanism, such as a spring, against the brake rotor, and which can be detached from the brake rotor by a brake lifter against the force of the energy storing mechanism.

2. Description of the Prior Art

Energy storing brakes of the above type are used in vehicles of various types, including industrial trucks, as parking brakes. These parking brakes are always released during normal operation of the vehicle. In this released state, the brake lifter creates an air gap between the brake rotor and the braking body. When the vehicle is turned off or when a switch for the parking brake is actuated, the brake lifter is deactivated, whereupon the energy storing brake engages as a result of the force of the energy storing mechanism. The braking force of this conventional energy storing brake is fixed and cannot be varied during the operation of the vehicle.

The prior art also includes energy storing brakes having an electromagnet as the brake lifter. The braking torque can be controlled by an operator during operation of the vehicle. For this purpose, DE 195 48 517 A1, for example, teaches that it is possible to alter the current flowing through the electromagnet to adjust the braking torque. However, the electrical control device required for this purpose is very complex and expensive. An energy storing brake of this type also has the disadvantage that the maximum braking torque is determined by the force of a spring, and during a braking process, the maximum braking force cannot be increased beyond the value defined by the spring.

Therefore, it is an object of the invention to provide a brake that can be continuously actuated by means of a simple device and in which the maximum braking force can be influenced or controlled by the operator during the braking of the vehicle.

SUMMARY OF THE INVENTION

The invention teaches that this object can be accomplished if a hydraulic cylinder that can be selectively pressurized as required is provided, by means of which a supplemental force in the same direction and in addition to the force of the energy storing mechanism can be exerted on the braking body. A piston of the hydraulic cylinder presses the braking body against the brake rotor, whereby the supplemental force and thus the braking torque of the energy storing brake can be increased by increasing the pressure in the hydraulic cylinder. It is also possible, by means of the hydraulic cylinder, to influence or control the energy storing brake independently of the status of the brake lifter, such as an electromagnet.

The hydraulic cylinder can be appropriately pressurized as a function of the actuation of a brake control mechanism, preferably a brake pedal, by an operator. The operator can control the pressure in the hydraulic cylinder by actuating the brake control mechanism, which can be realized in the form of a brake pedal or a brake lever, for example. The pressure in the hydraulic cylinder is preferably at least approximately proportional to the actuation force of the brake control mechanism.

In this case, it is advantageous if the brake control mechanism is effectively connected to a hydraulic master brake cylinder. The master brake cylinder generates a hydraulic pressure from the mechanical force acting on the brake control mechanism. With this hydraulic pressure, which can also be boosted by means of a booster brake, the hydraulic cylinder located on the energy storing brake is pressurized and the supplemental force is thereby generated.

It is likewise advantageous if the brake control mechanism is effectively connected to a valve that connects the hydraulic cylinder with a working hydraulic pump of the vehicle. In this embodiment, the hydraulic cylinder located on the energy storing brake can be pressurized with a hydraulic pressure derived from a working hydraulic system of the vehicle. The magnitude of this hydraulic pressure is defined by means of the above mentioned valve by the operator by actuating the brake control mechanism.

In one appropriate refinement of the invention, the braking body can be moved by means of the hydraulic cylinder, against the force of the brake lifter, from a position detached or spaced from the brake rotor into a position in which the braking body is in contact with the brake rotor. The force of the energy storing mechanism can be overcome by means of the hydraulic cylinder. The energy storing brake can therefore be actuated even if the parking brake is released. For this purpose, the sum of the forces that can be exerted on the braking body by means of the energy storing mechanism and by means of the hydraulic cylinder should be quantitatively greater than the force that can be exerted on the braking body by means of the brake lifter.

If the brake lifter is realized in the form of a hydraulic cylinder, there is the advantage that the lifting force exerted by this hydraulic cylinder is constant, regardless of the position of the braking body. The magnitude of this braking force is exclusively a function of the hydraulic pressure available in the hydraulic cylinder of the brake lifter.

If the brake lifter is realized in the form of an electromagnet, the brake lifter can be controlled by an electrical signal, e.g., a signal that can be generated by the main power switch on the vehicle. In this case, attention must be paid to the fact that, in the position of the braking body when the brake is released, if the air gap between the electromagnet and the braking body is minimal, the electromagnet exerts a maximum force on the brake body. The sum of the force of the energy storing mechanism and the supplemental force of the hydraulic cylinder should be quantitatively greater than the maximum force of the electromagnet.

This disadvantage can be eliminated if a current that flows through the electromagnet can be influenced as a function of the actuation of the brake control mechanism. It is possible, for example, to automatically reduce the current flowing through the electromagnet to a specified value when the brake control mechanism is actuated. The supplemental force that must be applied by the hydraulic cylinder to initiate an operational braking can thereby be reduced.

A complete understanding of the invention will be obtained from the following description when taken in connection with the accompanying drawing FIGURE wherein like reference characters identify like parts throughout.

BRIEF DESCRIPTION OF THE DRAWING

Additional advantages and details of the invention are explained in greater detail below and with reference to an exemplary embodiment of an energy storing brake and brake system schematically illustrated in the accompanying drawing FIGURE. The drawing FIGURE is a side, sectional view of an energy storing brake and brake system of the invention.

DESCRIPTION OF THE PREFERRED EMBODIMENT

For purposes of the description hereinafter, the terms "right", "left", "top", "bottom", "front", "rear" and derivations thereof shall relate to the invention as it is oriented in the drawing FIGURE. However, it is to be understood that the invention may assume various alternative variations and step sequences, except where specified to the contrary. It is also to be understood that the specific devices illustrated in the attached drawing, and described in the following specification, are simply exemplary embodiments of the invention. Hence, specific physical characteristics related to the embodiments described herein are not to be considered as limiting.

The drawing FIGURE shows an energy storing brake 20 of the invention which is designed preferably for use in a vehicle such as an industrial truck. The brake 20 includes an immovable brake housing 2 and a likewise immovable brake stator 6. A rotating shaft 10 is connected to a driver 7 on which a brake rotor 5 is mounted. The brake rotor 5 can be displaced in an axial direction, as shown by arrow A. Friction linings 5*a* are fastened to the brake rotor 5. The brake 20 also has a braking body 3 which is non-rotationally mounted on the brake housing 2, but can be displaced in the axial direction A.

When the vehicle is out of operation or when a switch for the parking brake is actuated, the braking body 3 is pressed by an energy storing device or mechanism 4, preferably in the form of compression springs, against the right brake lining 5*a*. As a result of which, the rotor 5 is moved to the left such that the left brake lining 5*a* comes into contact with the brake stator 6. The friction of the rotating brake lining 5*a* on the braking body 3 or on the brake stator 6 results in a deceleration of the shaft 10. A brake lifter, such as an electromagnet formed by a coil 1 and located in the brake housing 2, is currentless in this operating condition. A hydraulic cylinder 8 is also located in the brake housing 2 and has a piston 8*a*. The hydraulic cylinder 8 is not pressurized in this operating condition.

The hydraulic cylinder 8 has a connection 9 in flow communication with a hydraulic fluid source 22, such as the vehicle hydraulic system. The hydraulic fluid source 22 is operationally connected to a brake control mechanism 24, such as a brake pedal or brake lever. The brake control mechanism 24 is preferably operationally connected to a hydraulic master brake cylinder 26, which generates a hydraulic pressure proportional to the mechanical force acting on the brake control mechanism 24. The brake control mechanism 24 is preferably operationally connected to a valve 28 in flow communication with a hydraulic pump 30 of the vehicle.

Starting from the operating status, to release the brake 20, a DC voltage is applied to the coil 1 of the electromagnet, as a result of which the magnetic force moves the braking body 3 against the force of the energy storing mechanism 4 toward the brake housing 2 and out of contact with the brake lining 5*a*. The brake rotor 5 is thereby free to rotate.

An operating braking can then be initiated by pressurizing the hydraulic cylinder 8 by means of the connection 9. Pressurizing the hydraulic cylinder 8 moves the piston 8*a* to the left. The piston 8*a* thus exerts a supplemental force on the braking body 3 and moves the braking body 3, against the force of the electromagnet, toward the brake rotor 5. The brake linings 5*a* are thereby pressed against the brake stator 6 or the braking body 3, as a result of which the shaft 10 is decelerated. The magnitude of the braking force is thereby a direct function of the pressure in the hydraulic cylinder 8, which the invention teaches may be controlled by an operator of the vehicle by means of the brake control mechanism 24, such as a brake lever or a brake pedal.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrated only and are not limiting to the scope of the invention which is to be given the full breadth of the appended claims and any and all equivalents thereof.

What is claimed is:

1. An energy storing brake for a vehicle, comprising:

a rotatable brake rotor;

a non-rotatable braking body movable relative to the brake rotor;

an energy storing device;

a brake lifter, wherein the brake lifter includes an electromagnet; and a hydraulic cylinder;

wherein the braking body is movable by the energy storing device toward the brake rotor to apply a force against the brake rotor;

wherein the braking body is movable away from the brake rotor by the brake lifter against a force of the energy storing device; and wherein the hydraulic cylinder is selectively pressurizable to apply a supplemental force in the same direction as the force of the energy storing device on the braking body.

2. The energy storing brake as claimed in claim 1, wherein the hydraulic cylinder is connected to a brake control mechanism and the hydraulic cylinder is pressurized as a function of the actuation of a brake control mechanism by an operator.

3. The energy storing brake as claimed in claim 2, wherein the brake control mechanism is connected to a hydraulic master brake cylinder.

4. The energy storing brake as claimed in claim 2, wherein the brake control mechanism is connected to a valve that connects the hydraulic cylinder with a hydraulic pump of the vehicle.

5. The energy storing brake as claimed in claim 2, wherein the brake control mechanism is a brake pedal.

6. The energy storing brake as claimed in claim 1, wherein the braking body is movable by the hydraulic cylinder against the force of the brake lifter between a position in which the braking body is detached from the brake rotor to a position in which the braking body is in contact with the brake rotor.

7. The energy storing brake as claimed claim 1, wherein a sum of the forces exerted on the braking body by the energy storing device and the hydraulic cylinder is greater than the force exerted on the braking body by the brake lifter.

8. The energy storing brake as claimed in claim 1, including a brake control mechanism, wherein a current flowing through the electromagnet is substantially proportional to an actuation force applied to the brake control mechanism by an operator.

9. The energy storing brake as claimed in claim 1, wherein the energy storing device is a spring.

\* \* \* \* \*

UNITED STATES PATENT AND TRADEMARK OFFICE
CERTIFICATE OF CORRECTION

PATENT NO. : 6,142,266
DATED : November 7, 2000
INVENTOR(S) : Matthias Appeldorn et al.

It is certified that error appears in the above-identified patent and that said Letters Patent is hereby corrected as shown below:

Claim 7 Column 4 Line 52 after "claimed" insert --in--.

Signed and Sealed this

Fifteenth Day of May, 2001

Attest:

NICHOLAS P. GODICI

Attesting Officer      Acting Director of the United States Patent and Trademark Office